United States Patent
Arai et al.

(10) Patent No.: US 10,610,964 B2
(45) Date of Patent: Apr. 7, 2020

(54) GRAIN-ORIENTED ELECTRICAL STEEL SHEET CAUSING LOW CORE LOSS AND LOW MAGNETOSTRICTION

(71) Applicant: NIPPON STEEL & SUMITOMO METAL CORPORATION, Tokyo (JP)

(72) Inventors: Satoshi Arai, Kisarazu (JP); Hideyuki Hamamura, Futtsu (JP); Kenichi Murakami, Kitakyushu (JP); Hiroyasu Fujii, Kitakyushu (JP); Hideyuki Kobayashi, Himeji (JP); Norikazu Fujii, Kitakyushu (JP); Masato Mizokami, Kimitsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 665 days.

(21) Appl. No.: 15/308,781

(22) PCT Filed: May 8, 2015

(86) PCT No.: PCT/JP2015/063357
§ 371 (c)(1),
(2) Date: Nov. 3, 2016

(87) PCT Pub. No.: WO2015/170755
PCT Pub. Date: Nov. 12, 2015

(65) Prior Publication Data
US 2017/0182591 A1    Jun. 29, 2017

(30) Foreign Application Priority Data
May 9, 2014    (JP) ................................. 2014-097685

(51) Int. Cl.
*B23K 26/08* (2014.01)
*C22C 38/02* (2006.01)
(Continued)

(52) U.S. Cl.
CPC ............ *B23K 26/08* (2013.01); *B23K 26/206* (2013.01); *C21D 8/1283* (2013.01);
(Continued)

(58) Field of Classification Search
CPC ...... C21D 9/46; C21D 8/1283; C21D 8/1288; C21D 8/1294; C21D 2201/05;
(Continued)

(56) References Cited

U.S. PATENT DOCUMENTS

2002/0157734 A1* 10/2002 Senda .................. C21D 8/1266
148/111
2013/0098508 A1    4/2013 Yamaguchi et al.
(Continued)

FOREIGN PATENT DOCUMENTS

EP    1 154 025 A2    11/2001
JP    63-286521 A    11/1988
(Continued)

OTHER PUBLICATIONS

Extended European Search Report dated Oct. 24, 2017, in European Patent Application No 15788697.9.
(Continued)

*Primary Examiner* — Daniel C. McCracken
(74) *Attorney, Agent, or Firm* — Birch, Stewart, Kolasch & Birch, LLP (57) ABSTRACT

A grain-oriented electrical steel sheet includes: a base steel sheet; a primary film formed on a surface of the base steel sheet; and a tension insulation coating formed on a surface of the primary film, in which a magnetic domain control is performed by irradiating the tension insulation coating with a laser from above. When a strip-like sample having a length of 300 mm in a direction parallel to a rolling direction of the grain-oriented electrical steel sheet and a length of 60 mm in a direction parallel to a transverse direction is extracted from (Continued)

the grain-oriented electrical steel sheet, a range from a surface of the tension insulation coating to a depth position of 5 μm toward the base steel sheet side from an interface between the base steel sheet and the primary film is removed by pickling at least one surface of the sample, and a warpage amount of the sample is thereafter measured, the warpage amount satisfies predetermined conditions.

7 Claims, 1 Drawing Sheet

(51) Int. Cl.
| | | |
|---|---|---|
| *H01F 1/16* | (2006.01) | |
| *C22C 38/00* | (2006.01) | |
| *C21D 9/46* | (2006.01) | |
| *H01F 1/18* | (2006.01) | |
| *C21D 8/12* | (2006.01) | |
| *B23K 26/20* | (2014.01) | |

(52) U.S. Cl.
CPC .......... *C21D 8/1288* (2013.01); *C21D 8/1294* (2013.01); *C21D 9/46* (2013.01); *C22C 38/00* (2013.01); *C22C 38/02* (2013.01); *H01F 1/16* (2013.01); *H01F 1/18* (2013.01); *C21D 2201/05* (2013.01)

(58) Field of Classification Search
CPC . C22C 38/00; C22C 38/02; H01F 1/16; H01F 1/18; B23K 26/206; B23K 26/08
See application file for complete search history.

(56) References Cited

U.S. PATENT DOCUMENTS

| 2013/0129985 A1 | 5/2013 | Inoue et al. |
| 2013/0213525 A1 | 8/2013 | Shingaki et al. |
| 2015/0010762 A1 | 1/2015 | Yamaguchi et al. |

FOREIGN PATENT DOCUMENTS

| JP | 6-145998 A | 5/1994 |
| JP | 8-222423 A | 8/1996 |
| JP | 2002-356750 A | 12/2002 |
| JP | 2005-317683 A | 11/2005 |
| JP | 2007-2334 A | 1/2007 |
| JP | 2011-246770 A | 12/2011 |
| JP | 2012-31498 A | 2/2012 |
| JP | 2012-31519 A | 2/2012 |
| JP | 2012-36447 A | 2/2012 |
| JP | 2012-52233 A | 3/2012 |
| RU | 2 358 346 C1 | 6/2009 |
| RU | 2 503 729 C1 | 1/2014 |
| WO | WO 2009/104521 A1 | 8/2009 |
| WO | WO 2012/017670 A1 | 2/2012 |
| WO | WO 2013/099160 A1 | 7/2013 |

OTHER PUBLICATIONS

International Search Report for PCT/JP2015/063357 dated Aug. 11, 2015.
Written Opinion of the International Searching Authority for PCT/JP2015/063357 (PCT/ISA/237) dated Aug. 11, 2015.
Office Action dated Jan. 18, 2018, in Russian Patent Application No. 2016144288/02, with English translation.
Written Opposition to the Grant of a Patent issued Nov. 20, 2018, in Japanese Patent No. 6315084, with English translation.

* cited by examiner

GRAIN-ORIENTED ELECTRICAL STEEL SHEET CAUSING LOW CORE LOSS AND LOW MAGNETOSTRICTION

TECHNICAL FIELD OF THE INVENTION

The present invention relates to a grain-oriented electrical steel sheet used in the core of a transformer or the like, and more particularly, to a grain-oriented electrical steel sheet which contributes to a reduction in noise as well as a reduction in core loss of a core and causes low core loss and low magnetostriction.

Priority is claimed on Japanese Patent Application No. 2014-97685, filed on May 9, 2014, the content of which is incorporated herein by reference.

RELATED ART

A grain-oriented electrical steel sheet is generally used in a stationary induction apparatus represented by a transformer. Characteristics to be satisfied by the grain-oriented electrical steel sheet include low core loss, ease of excitation, low magnetostriction, and the like.

A transformer is continuously excited over a long period of time from installation to disuse and thus continuously generates energy losses. Due to these characteristics, low core loss is particularly required.

In order to reduce the core losses of a grain-oriented electrical steel sheet, core losses have been improved by metallurgical methods such as increasing the degree of integration along a (110) [001] orientation called the Goss orientation, reducing the amount of impurities in a steel sheet product, reducing the size of grains, and applying a coating that imparts surface tension to a steel sheet. However, these methods have limitations, and a reduction in core loss using other methods is required.

For such a problem, a method of refining magnetic domains themselves has been developed. Currently, a technique of irradiating the surface of a steel sheet with a laser to introduce strain into the steel sheet and reducing the widths of magnetic domains thereby reducing the core loss has been widely used.

As described above, core loss of a grain-oriented electrical steel sheet has been significantly improved. On the other hand, a reduction in noise and vibration is further required by apparatuses for electromagnetic application such as a transformer. Therefore, a grain-oriented electrical steel sheet used in the core of a transformer also requires low magnetostriction as well as low core loss.

Laser irradiation for reducing core losses causes the introduction of residual strain and is effective in refining magnetic domain widths. However, it is known that laser irradiation becomes a source of magnetostriction.

Therefore, techniques in which, when magnetic domain control is performed by irradiating a grain-oriented electrical steel sheet, on which a coating is formed, with a laser, magnetostriction is reduced by adjusting laser irradiation conditions and film tension, thereby allowing low core loss and low magnetostriction to be compatible with each other are disclosed in Patent Documents 1 to 4.

Patent Document 1 discloses that as factors for determining magnetostriction, the tension of a primary film, the tension of a tension insulation coating, and the application of micro-strain through laser irradiation are very important, and by controlling these factors, a grain-oriented electrical steel sheet which has magnetostriction characteristics for low noise and causes low core loss can be provided.

Patent Document 1 discloses that pulse laser irradiation was performed to cause the total tension of the primary film and a secondary coating applied thereafter on a steel sheet to be 1 MPa to 8 MPa and cause the amount of heat input per unit area of the steel sheet to be 1 mJ/mm$^2$ to 2 mJ/mm$^2$, otherwise the pulse laser irradiation being performed to cause the tension to be 14 MPa or higher and the amount of heat input to be 1.5 mJ/mm$^2$ to 3 mJ/mm$^2$.

Patent Document 2 discloses a grain-oriented electrical steel sheet having a forsterite film and a tension coating, in which, in order to prevent the deterioration of magnetostriction characteristics due to damage to the coatings in a case where magnetic domain refinement is performed through laser irradiation, the total tension A applied to the steel sheet in a rolling direction from the forsterite film and the tension coating is 10.0 MPa or higher, the total tension B in a direction perpendicular to the rolling direction is 5.0 MPa or higher, and the ratio A/B between the total tensions A and B is set to 1.0 to 5.0.

Patent Document 3 discloses a technique in which, when magnetic domain control is performed by irradiating a grain-oriented electrical steel sheet with a laser, the thickness of a solidified layer of a laser irradiated portion is set to 4 μm at the maximum to cause strain to be introduced only into a narrow range in a rolling direction, thereby reducing core losses and simultaneously suppressing magnetostrictive deformation.

Patent Document 4 discloses a technique in which, before laser irradiation is performed on a grain-oriented electrical steel sheet, the amount of a primary film and the amount of a tension insulation coating are detected, and the laser irradiation is performed under appropriate irradiation conditions depending on the detected amounts, thereby reducing core losses and simultaneously reducing magnetostriction and noise in a transformer.

PRIOR ART DOCUMENT

Patent Document

[Patent Document 1] Japanese Unexamined Patent Application, First Publication No. 2002-356750
[Patent Document 2] Japanese Unexamined Patent Application, First Publication No. 2012-031498
[Patent Document 3] Japanese Unexamined Patent Application, First Publication No. 2007-002334
[Patent Document 4] Japanese Unexamined Patent Application, First Publication No. 2012-031519

DISCLOSURE OF THE INVENTION

Problems to be Solved by the Invention

As described above, techniques in which, when magnetic domain control is performed by irradiating a grain-oriented electrical steel sheet, on which a coating is formed, with a laser, the film tension and laser irradiation conditions are adjusted and thus low core loss and low magnetostriction are allowed to be compatible with each other have been disclosed. However, from the viewpoint of further enhancing magnetostriction characteristics in a state in which a high core loss reduction effect is maintained by laser irradiation, a further improvement is preferable.

The present invention has been made taking the foregoing circumstances into consideration, and an object thereof is to provide a grain-oriented electrical steel sheet which allows low core loss and low magnetostriction to be compatible with each other.

Means for Solving the Problem

The core losses of a grain-oriented electrical steel sheet are reduced by minimizing the sum of eddy-current loss and hysteresis loss. In addition, the eddy-current loss and the hysteresis loss are subjected to having complex variation with respect to various material parameters. In addition, the magnetostrictive deformation of the grain-oriented electrical steel sheet is also subjected to having complex variation with respect to various material parameters.

For example, stress is applied to a base steel sheet by coatings (a tension insulation coating and a primary film (glass coating)) applied to a grain-oriented electrical steel sheet, and stress is applied to the base steel sheet also by laser irradiation for magnetic domain control.

The inventors found that a range of stress applied due to film tension and a laser in which the core loss and the magnetostriction were minimized with a good balance was present depending on the degree of an effect of such a stress distribution.

In addition, the inventors evaluated the stress according to variation in the warpage amount of a grain-oriented electrical steel sheet and found a range in which magnetostriction was optimized.

The gist of the present invention is as follows.

(1) According to an aspect of the present invention, a grain-oriented electrical steel sheet includes: a base steel sheet; a primary film formed on a surface of the base steel sheet; and a tension insulation coating formed on a surface of the primary film, in which a magnetic domain control is performed by irradiating the tension insulation coating with a laser from above. When a strip-like sample having a length of 300 mm in a direction parallel to a rolling direction of the grain-oriented electrical steel sheet and a length of 60 mm in a direction parallel to a transverse direction is extracted from the grain-oriented electrical steel sheet, a range from a surface of the tension insulation coating to a depth position of 5 μm toward the base steel sheet side from an interface between the base steel sheet and the primary film is removed by pickling at least one surface of the sample, and a warpage amount of the sample is thereafter measured, the warpage amount satisfies the following expressions A and B.

$$15000\ \mu m \le S_A - S_C \le 35000\ \mu m \quad \text{(Expression A)}$$

$$900\ \mu m \le S_B + S_C \le 14000\ \mu m \quad \text{(Expression B)}$$

Here, $S_A$, $S_B$, and $S_C$ are described below.

$S_A$: a warpage amount of the grain-oriented electrical steel sheet in the unit of μm when only one surface subjected to laser irradiation is pickled, $S_B$: a warpage amount of the grain-oriented electrical steel sheet in the unit of μm when only one surface on a side opposite to the side subjected to laser irradiation is pickled, and $S_C$: a warpage amount of the grain-oriented electrical steel sheet in the unit of μm when both surfaces are pickled, here, warpage in the same direction as that of the pickled surface during measurement of $S_A$ and $S_B$ is expressed as a positive value, and warpage in $S_C$ in the same direction as that of $S_A$ is expressed as a positive value.

(2) In the grain-oriented electrical steel sheet described in (1), a value $d_t/d_p$ obtained by dividing an average thickness $d_t$ of the tension insulation coating in the unit of μm by an average thickness $d_p$ of the primary film in the unit of μm may be 0.1 or higher and 3.0 or lower.

(3) In the grain-oriented electrical steel sheet described in (1), a value $d_t/d_p$ obtained by dividing an average thickness $d_t$ of the tension insulation coating in the unit of μm by an average thickness $d_p$ of the primary film in the unit of μm may be 0.1 or higher and 1.5 or lower.

(4) In the grain-oriented electrical steel sheet described in (1), a value $d_t/d_p$ obtained by dividing an average thickness $d_t$ of the tension insulation coating in the unit of μm by an average thickness $d_p$ of the primary film in the unit of μm may be 0.1 or higher and 1.0 or lower.

(5) In the grain-oriented electrical steel sheet described in any one of (1) to (4), the average thickness of the tension insulation coating may be 0.5 μm or greater and 4.5 μm or smaller.

(6) In the grain-oriented electrical steel sheet described in any one of (1) to (5), a total tension applied to the base steel sheet from the primary film and the tension insulation coating may be 1 MPa or higher and 10 MPa or lower.

Effects of the Invention

According to the present invention, a grain-oriented electrical steel sheet which is excellent in both core loss and magnetostriction can be provided.

EMBODIMENT OF THE INVENTION

Hereinafter, a preferred embodiment of the present invention will be described in detail.

In a grain-oriented electrical steel sheet having a primary film (glass coating) and a tension insulation coating formed on both surfaces thereof, the grain-oriented electrical steel sheet in which one surface is subjected to a magnetic domain refining treatment through laser irradiation receives stress due to film tension and stress due to the laser irradiation.

It is well known that magnetostriction is significantly affected by stress applied to a magnetic steel sheet. According to the magnitudes of the two types of stress described above, the degree of an effect on magnetostriction varies.

The inventors examined the degree of an effect of film tension caused by a primary film and a tension insulation coating on magnetostriction and the degree of an effect of stress caused by laser irradiation on magnetostriction in further detail.

As a result, the inventors evaluated stress caused by film tension and stress caused by laser irradiation in terms of the warpage amount of a grain-oriented electrical steel sheet, and found that by adjusting variation in the warpage amount based on the stress caused by film tension, the stress caused by film tension and variation in the warpage amount based on the stress caused by laser irradiation, a range in which optimized magnetostriction was present.

First, the experiment in which such knowledge was obtained will be described.

A cold-rolled steel sheet which contained 3.2 mass % of Si and was rolled to a sheet thickness of 0.23 mm was subjected to decarburization annealing and a primary recrystallization annealing by changing the dew point. Thereafter, finish annealing was performed on the resultant in a state in which an annealing separator primarily containing MgO was applied to the surface of the steel sheet, and grain-oriented electrical steel sheet materials having primary films (glass coatings) with various thicknesses were obtained.

Next, a number of samples were cut from the obtained grain-oriented electrical steel sheet materials, and a coating treatment liquid containing colloidal silica and aluminum phosphate was applied thereto. The coating weight of the coating treatment liquid varied with samples. The samples to which the coating treatment liquid was applied were baked at a temperature of 800° C., thereby forming tension insulation coatings (secondary coatings) with various thicknesses. Thereafter, one surface of each of the samples was subjected to a magnetic domain refining treatment by emitting continuous wave lasers with different irradiation energies (amounts of heat input).

Accordingly, a number of grain-oriented electrical steel sheets with different coating forming conditions and different laser irradiation conditions were obtained.

From the obtained grain-oriented electrical steel sheet, samples having a length of 500 mm in a direction parallel to a rolling direction and a length of 100 mm in a direction parallel to a transverse direction were cut, and a core loss $W_{17/50}$ and a magnetostriction $\lambda_{0-p}$, were measured.

Here, the core loss $W_{17/50}$ is a core loss at an excitation flux density of 1.7 T, 50 Hz and was measured using a single sheet tester (SST).

In addition, the magnetostriction $\lambda_{0-p}$ was calculated by the following expression (1) using a material length L at the maximum excitation flux density and a material length $L_0$ at a flux density of 0, for example, during excitation at 50 Hz.

$$\lambda_{0-p}=(L-L_0)/L_0 \tag{1}$$

Figure 2:
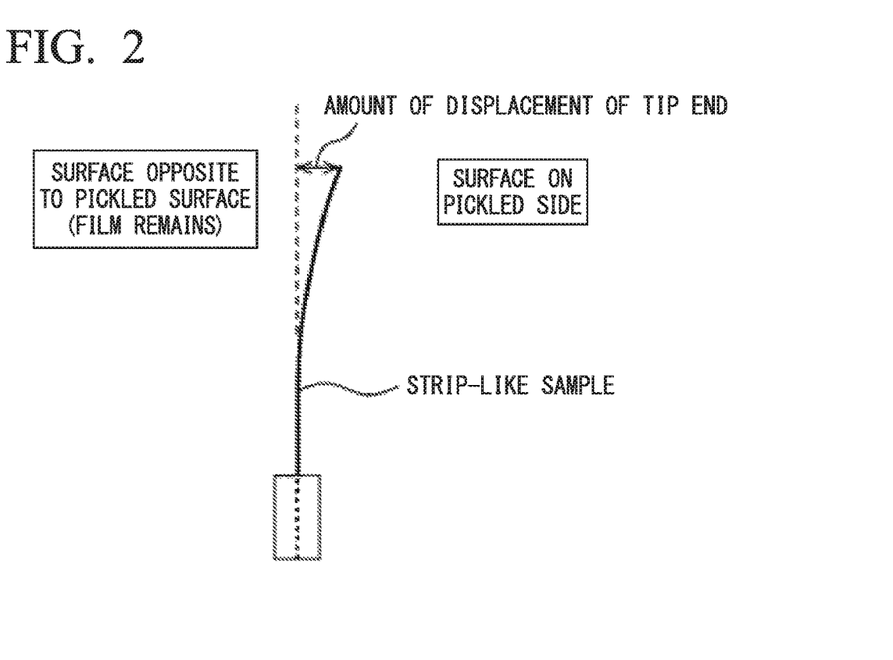
FIG. 2 is a view showing a method of measuring the amount of displacement (warpage amount) of the tip end of a sample.

Next, from the grain-oriented electrical steel sheet, strip-like samples having a length of 300 mm in the direction parallel to the rolling direction and a length of 60 mm in the direction parallel to the transverse direction were extracted, and one surface of the sample or both surfaces of the sample was pickled in the following modes a to c. By pickling the samples, a range from the surface of the tension insulation coating to a depth position of 5 μm toward the base steel sheet side from the interface between the base steel sheet and the primary film was removed. Thereafter, the warpage amount of the tip end of each of the samples was measured.

a. pickling only one surface of the sample subjected to laser irradiation
b. pickling only one surface of the sample on the side opposite to the side subjected to laser irradiation
c. pickling both surfaces of the sample As shown in FIG. 2, the warpage amount after the pickling was obtained by vertically placing the sample in a state in which 30 mm of one end of the sample in a longitudinal direction was nipped by a clamp, and measuring the amount of displacement (warpage amount) of one end on the opposite side. Regarding the measurement, during measurement in the modes a and b, warpage in the same direction as that of the pickled surface was expressed as a positive value, and during measurement in the mode c, warpage in the same direction as that in the mode a was expressed as a positive value.

The measurement results are summarized from the viewpoint of an effect of tension applied by the coatings (film tension) and an effect of stress applied by the film tension and laser irradiation (stress applied by the film tension and the laser) regarding the base steel sheet from which the coatings were not formed and an effect of strain caused by laser irradiation was removed. That is, when it is assumed that the warpage amount (μm) of the grain-oriented electrical steel sheet when only one surface on the side subjected to laser irradiation is pickled is $S_A$, the warpage amount (μm) of the grain-oriented electrical steel sheet when only one surface on the side opposite to the side subjected to laser irradiation is pickled is $S_B$, and the warpage amount (μm) of the grain-oriented electrical steel sheet when both surfaces are pickled is $S_C$, using $$\Delta S_C = S_A - S_C, \text{ and}$$

$$\Delta S_L = S_B + S_C$$

the relationship between the core loss and the magnetostriction regarding $\Delta S_C$ and $\Delta S_L$ of each of the samples was examined.

Figure 1:
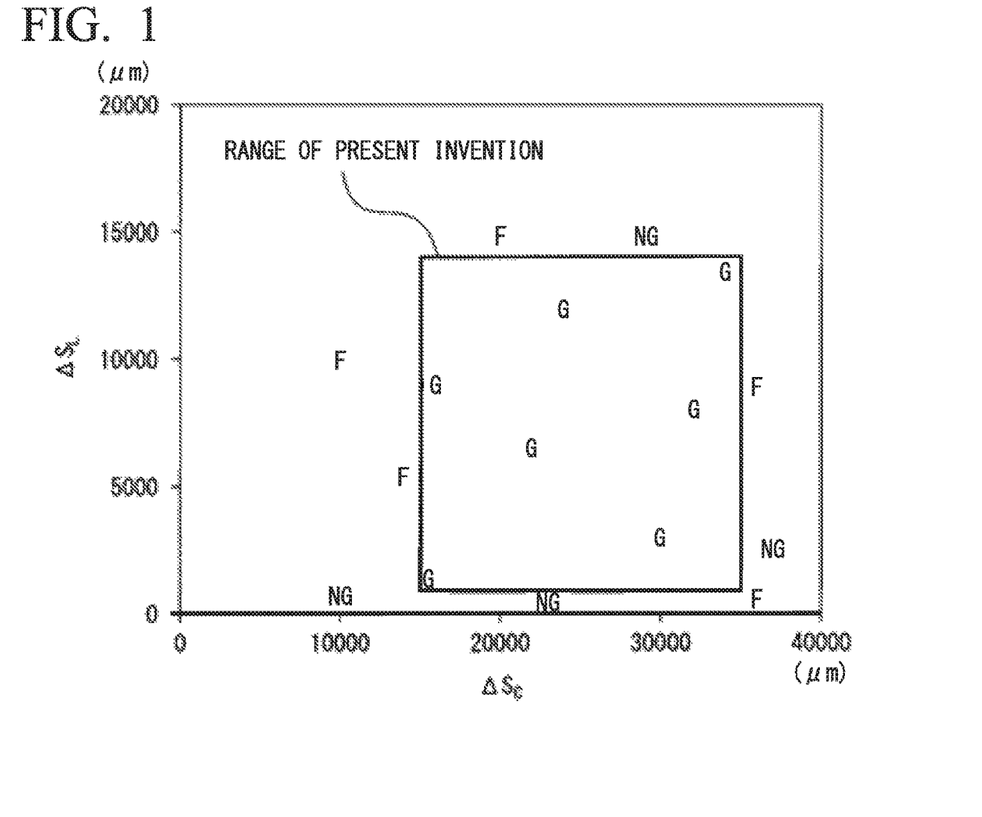
FIG. 1 is a diagram showing the relationship between the warpage amount, core loss, and magnetostriction of a grain-oriented electrical steel sheet in a case where the surface of the grain-oriented electrical steel sheet is removed.

The results are shown in FIG. 1. In FIG. 1, in each of the samples used for the measurement, a case where the core loss $W_{17/50}$ was 0.75 W/kg or less and the magnetostriction $\lambda_{0-p}$ in a case of no load stress was $0.25 \times 10^{-6}$ or less was represented as G (Good) as both low core loss and low magnetostriction being satisfied, a case where the core loss $W_{17/50}$ was higher than 0.75 W/kg or the magnetostriction $\lambda_{0-p}$ was higher than $0.25 \times 10^{-6}$ was represented as F (Fair) as only one of low core loss and low magnetostriction being satisfied, and a case where the core loss $W_{17/50}$ was higher than 0.75 W/kg and the magnetostriction $\lambda_{0-p}$ was higher than $0.25 \times 10^{-6}$ was represented as NG (Not Good) as both low core loss and low magnetostriction being unsatisfied.

From FIG. 1, when both $\Delta S_C$ and $\Delta S_L$ were in ranges of
$\Delta S_C$: 15,000 μm to 35,000 μm, and
$\Delta S_L$: 900 μm to 14,000 μm,
the result that low core loss and low magnetostriction were compatible with each other was obtained.

The embodiment is the result of examinations described above, and requirements of the embodiment and preferable requirements will be further described.

An object of the embodiment is a grain-oriented electrical steel sheet which has a primary film (representatively a forsterite film) formed on both surfaces of a base steel sheet during finish annealing in a production process and a tension insulation coating applied onto the resultant and baked, and is subjected to magnetic domain control by irradiating one surface with a laser.

As disclosed in Japanese Unexamined Patent Application, First Publication No. S54-43115, even in a case where a tension insulation coating is formed on a grain-oriented electrical steel sheet having a surface in a mirror surface state, the spirit of the embodiment is not hindered.

The base steel sheet may be produced by performing hot rolling and cold rolling on a silicon steel material containing 1.0 mass % to 4.0 mass % of Si to form a steel sheet having a predetermined sheet thickness, and thereafter performing decarburization annealing, application of an annealing separator, and finish annealing on the resultant. A detailed production method will be described later.

In this embodiment, regarding the grain-oriented electrical steel sheet, samples were extracted from the grain-oriented electrical steel sheet by adjusting coating forming conditions for the primary film, the tension insulation coating and laser irradiation conditions, and one surface of the sample or both surfaces of the sample were pickled in the modes a to c. When the warpage amount after the pickling was measured, by controlling $\Delta S_C$ defined as $S_A - S_C$ to be in a range of 15,000 μm to 35,000 μm and controlling $\Delta S_L$ defined as $S_B + S_C$ to be in a range of 900 μm to 14,000 μm, both core loss and magnetostriction can be reduced.

As shown in the example of FIG. 1 described above, this condition is obtained as a condition that enables a grain-oriented electrical steel sheet in which low core loss and low magnetostriction are compatible with each other, as a result of producing a number of grain-oriented electrical steel sheet with different warpage amounts by changing the coating forming conditions and laser irradiation conditions, evaluating the warpage amounts using $\Delta S_C$ and $\Delta S_L$, and examining the relationship between the core loss and the magnetostriction of the grain-oriented electrical steel sheets.

Here, during the removal of the surface of the grain-oriented electrical steel sheet through pickling for the measurement of the warpage amount, it is preferable to remove the entire residual strain portion caused by laser irradiation of the primary film, the tension insulation coating, and the base steel sheet. Therefore, the surface of the grain-oriented electrical steel sheet is pickled to remove a range from the surface of the tension insulation coating to a depth position of 5 μm toward the base steel sheet side from the interface between the base steel sheet and the primary film.

Through the pickling, it is preferable to remove a range from the interface to a depth position of 10 μm toward the base steel sheet side, and it is more preferable to remove a range from the interface to a depth position of 15 μm toward the base steel sheet side.

Here, when a range from the interface to a depth position of 50 μm toward the base steel sheet side is removed through the pickling, the sheet thickness of the grain-oriented electrical steel sheet is too thin to ensure sufficient measurement accuracy during the measurement of the warpage amount of the like. Therefore, when pickling is performed on the surface of the grain-oriented electrical steel sheet, it is preferable that the deepest position (upper limit) of the base steel sheet removed through the pickling is less than 50 μm from the interface toward the base steel sheet side.

In addition, the pickling of the grain-oriented electrical steel sheet may be performed, for example, in the following method. The grain-oriented electrical steel sheet is immersed in an aqueous solution of sodium hydroxide containing 10 mass % of NaOH and 90 mass % of $H_2O$ at a high temperature for a predetermined time. Next, the grain-oriented electrical steel sheet is immersed in an aqueous solution of sulfuric acid containing 10 mass % of $H_2SO_4$ and 90 mass % of $H_2O$ at a high temperature for a predetermined time. Thereafter, the grain-oriented electrical steel sheet is immersed in an aqueous solution of nitric acid containing 10 mass % of $HNO_3$ and 90 mass % of $H_2O$ at room temperature for a predetermined time so as to be cleaned. Last, the grain-oriented electrical steel sheet is dried with a warm air blower for less than one minute. By adjusting the immersion temperatures and immersion times, the amount of the surface removed from the grain-oriented electrical steel sheet may be controlled.

In addition, the warpage amount of the grain-oriented electrical steel sheet is obtained by extracting a strip-like sample having a length of 300 mm in the direction parallel to the rolling direction and a length of 60 mm in the direction parallel to the transverse direction from the grain-oriented electrical steel sheet, performing the pickling, vertically placing the sample in a state in which 30 mm of one end of the sample in the longitudinal direction is nipped by a clamp as shown in FIG. 2, and measuring the amount of displacement (warpage amount) of one end on the opposite side.

When the residual strain portion caused by the laser irradiation of the primary film, the tension insulation coating, and the base steel sheet is removed (in the mode a) by pickling only one surface on the side of the grain-oriented electrical steel sheet subjected to laser irradiation, the grain-oriented electrical steel sheet is curved due to the film tension of the surface that is not pickled. The warpage amount in this case is proportional to the film tension.

In addition, when the coatings of only the surface on the side of the grain-oriented electrical steel sheet opposite to the side subjected to the laser irradiation is removed (in the mode b), the grain-oriented electrical steel sheet is curved due to the stress applied by the film tension and the laser to the surface that is not pickled. The warpage amount in this case is proportional to the sum of the film tension and the stress applied by the laser.

The inventors confirmed that the upper limit (35,000 μm) of $\Delta S_C$ corresponds to a case of applying the tension insulation coating in a coating amount of 4.5 g/m$^2$, and the lower limit (15,000 μm) of $\Delta S_C$ corresponds to a case of applying the tension insulation coating in a coating amount of 1.0 g/m$^2$.

In addition, the inventors confirmed that the upper limit (14,000 μm) of $\Delta S_L$ corresponds to a laser irradiation energy intensity of 2.0 mJ/mm$^2$ at which magnetostriction does not become excessive, and the lower limit (900 μm) of $\Delta S_L$ corresponds to a laser irradiation energy density of 0.8 mJ/mm$^2$ at which a core loss improving effect can be obtained.

In order to cause $\Delta S_C$ and $\Delta S_L$ to be in the above range, the coating forming conditions, laser type, and laser irradiation conditions need to be adjusted. On the other hand, in a case where the grain-oriented electrical steel sheets are laminated on a core, the insulation resistance between the grain-oriented electrical steel sheets and the space factor of the entirety thereof need to satisfy predetermined conditions. Therefore, the coating amount is determined by the insulation resistance between the grain-oriented electrical steel sheets and the space factor of the entirety thereof. By causing the coating amount to be in a preferable range and then adjusting the coating forming conditions and laser irradiation conditions, the warpage amounts $\Delta S_C$ and $\Delta S_L$ of the grain-oriented electrical steel sheet are adjusted to be in the above-described range.

Specifically, it is confirmed that the tension insulation coating may be applied to both surfaces of the grain-oriented electrical steel sheet having the primary film to cause the coating amount to be in a range of 1.0 g/m$^2$ to 4.5 g/m$^2$, the resultant may be baked, and one surface may be irradiated with a laser at an irradiation energy density of 0.8 mJ/mm$^2$ to 2.0 mJ/mm$^2$.

In a case where the coating amount of the tension insulation coating is less than 1.0 g/m$^2$, when a core is produced by laminating the grain-oriented electrical steel sheets, the insulation resistance between the grain-oriented electrical steel sheets is insufficient. On the other hand, in a case where the coating amount of the tension insulation coating is more than 4.5 g/m$^2$, when a core is produced by laminating the grain-oriented electrical steel sheets, the space factor is reduced. In any of a case where the coating amount of the tension insulation coating is less than 1.0 g/m$^2$ and a case where the coating amount thereof is more than 4.5 g/m$^2$, the energy loss of a transformer is deteriorated. Therefore, the coating amount of the tension insulation coating is set to be in the above-described range.

In addition, a production method of the tension insulation coating will be described later.

As described above, the grain-oriented electrical steel sheet according to the embodiment is excellent in both core loss and magnetostriction. However, it is preferable that the grain-oriented electrical steel sheet is excellent also in space factor in addition to low core loss and low magnetostriction.

In general, in order to reduce eddy-current loss and improve core loss, the sheet thickness of the base steel sheet in the grain-oriented electrical steel sheet is reduced. Core loss is improved by reducing the sheet thickness of the base steel sheet. However, in a case where a transformer is produced with a base steel sheet having a small sheet thickness, an effect of significantly reducing energy loss is not necessarily achieved. This is caused by a space factor. The core of a transformer is configured by laminating grain-oriented electrical steel sheets. In a case where the sheet thickness of the base steel sheet is reduced without changing the film thickness of coatings, the ratio of the volume of iron (steel) to the volume of the entire core (called a space factor) is reduced. A reduction in space factor has an influence on the effect of reducing energy loss. That is, in order to increase the space factor, it is preferable that the film thickness of the coatings of the grain-oriented electrical steel sheet is small.

However, when the film thickness of the coatings of the grain-oriented electrical steel sheet is small, tension applied to the base steel sheet becomes insufficient, and thus an effect of improving core loss and magnetostriction cannot be sufficiently obtained. As described above, an improvement in core loss and magnetostriction and an improvement in space factor have a trade-off relationship and it is technically difficult to be compatible with each other with a good balance.

The inventors intensively studied and as a result, found that by controlling the warpage amounts: $\Delta S_C$ and $\Delta S_L$ to be in the above-described range and controlling the ratio R between the average thickness $d_t$ of the tension insulation coating and the average thickness $d_p$ of the primary film (the average thickness $d_t$ of the tension insulation coating/the average thickness $d_p$ of the primary film) in the unit of μm to be 0.1 or higher and 3.0 or lower, the effect of improving core loss and magnetostriction can be ensured, and simultaneously, the space factor can be further increased. Specifically, it was found that when each of the above conditions is satisfied, the effect of improving core loss and magnetostriction is ensured and simultaneously, a space factor of 97% or more can be obtained. That is, it was found that even in a case where the sheet thickness of the base steel sheet is reduced in order to reduce eddy-current loss, the volume fraction of the base steel sheet in the grain-oriented electrical steel sheet can be 97% or higher.

In addition, the volume fraction of the base steel sheet in the grain-oriented electrical steel sheet is preferably 98% or higher and more preferably 99% or higher.

It is thought that this effect is cause by the difference in physical properties between the tension insulation coating and the primary film. The tension insulation coating is formed of phosphate, colloidal silica, and the like, and the primary film is formed of forsterite $Mg_2SiO_4$ and the like. Due to the difference between the materials, there is a difference in physical properties between the tension insulation coating and the primary film. It is thought that a range of the ratio R between the film thicknesses of the tension insulation coating and the primary film having different physical properties in which the above-described technical characteristics are preferably controlled is present, and it becomes possible to simultaneously improve the technical characteristics which conflict with each other by optimally controlling the ratio R.

In addition, it is preferable that the grain-oriented electrical steel sheet has an excellent vibration damping ratio in addition to low core loss and low magnetostriction. In a case where the vibration damping ratio of the grain-oriented electrical steel sheet is high, vibration in apparatuses for electromagnetic application such as a transformer can be further reduced.

The inventors intensively studied and as a result, found that by controlling the ratio R (the average thickness $d_t$ of the tension insulation coating/the average thickness $d_p$ of the primary film) to be 0.1 or higher and 1.5 or lower, the vibration damping ratio as well as the space factor of the grain-oriented electrical steel sheet can be improved.

In a core in which grain-oriented electrical steel sheets having a base steel sheet with a small sheet thickness are laminated, vibration in the core due to magnetostriction is less likely to be attenuated. However, by appropriately controlling the ratio R between the film thicknesses of the tension insulation coating and the primary film to which strain (stress) is applied through laser irradiation, vibration is significantly attenuated. The detailed reason is not clear, but it is thought that in a case of a grain-oriented electrical steel sheet having a base steel sheet with a small sheet thickness, in addition to vibration due to stretching and contraction of the grain-oriented electrical steel sheet, vibration due to bending is likely to occur, and the stress state of the surface layer of the grain-oriented electrical steel sheet contributes to the attenuation of vibration. It is thought that the tension insulation coating and the primary film have different physical properties as described above and thus have different formation temperatures, and strain (stress) is further applied through laser irradiation, resulting in a unique stress state. Although the application of numerical analysis using FEM or the like is expected from the detailed description, it is thought that each of the conditions of the grain-oriented electrical steel sheet according to the embodiment is controlled to achieve a state in which the vibration damping ratio is high by controlling the ratio R to be 0.1 or higher and 1.5 or lower.

In addition, it is preferable that the grain-oriented electrical steel sheet has an excellent heat dissipating property in addition to low core loss and low magnetostriction. In a case where the grain-oriented electrical steel sheet has a significant heat dissipating property, the generation of heat (Joule heat) in a transformer is suppressed, and it becomes possible to achieve an increase in the efficiency and a reduction in the size of an electrical device.

The inventors intensively studied and as a result, found that by controlling the ratio R (the average thickness $d_t$ of the tension insulation coating/the average thickness $d_p$ of the primary film) to be 0.1 or higher and 1.0 or lower, the heat dissipating property of the grain-oriented electrical steel sheet can also be improved. It is thought that this effect can be also obtained by the difference in physical properties between the tension insulation coating and the primary film.

As described above, by controlling the warpage amounts: $\Delta S_C$ and $\Delta S_L$ to be in the above-described range and then controlling the ratio R to be 0.1 or higher and 3.0 or lower, the effect of improving core loss and magnetostriction can be ensured, and simultaneously, the space factor can be preferably increased. In addition, by controlling the ratio R to be 0.1 or higher and 1.5 or lower, the vibration damping ratio in addition to the space factor can be preferably improved. In addition, by controlling the ratio R to be 0.1 or higher and 1.0 or lower, the heat dissipating property in addition to the vibration damping ratio and the space factor can be preferably improved.

By controlling the ratio R to be 0.1 or higher and 0.8 or lower, more preferable space factor, vibration damping ratio, and heat dissipating property can be obtained. By controlling the ratio R to be 0.1 or higher and 0.3 or lower, even more preferable space factor, vibration damping ratio, and heat dissipating property can be obtained.

In a case where the ratio R between the average thickness $d_t$ of the tension insulation coating and the average thickness $d_p$ of the primary film is lower than 0.1 and higher than 3.0, preferable space factor, vibration damping ratio, and heat dissipating property cannot be obtained.

In order to limit the ratio R between the average thickness $d_t$ of the tension insulation coating and the average thickness $d_p$ of the primary film to be 0.1 or higher and 3.0 or lower, it is preferable that the average thickness of the tension insulation coating is 0.5 µm or greater and 4.5 µm or smaller.

The average thickness of the tension insulation coating is more preferably 2.0 µm or smaller, 1.5 µm or smaller, 1.0 µm or smaller, and 0.8 µm or smaller.

Furthermore, it is preferable that the total tension applied to the base steel sheet from the primary film and the tension insulation coating is 1 MPa or higher and 10 MPa or lower. By limiting the total tension applied to the base steel sheet from the primary film and the tension insulation coating to 1 MPa or higher and 10 MPa or lower, the magnetostriction and core loss of the grain-oriented electrical steel sheet can be simultaneously reduced.

In addition, as a method of measuring the average thickness $d_t$ of the tension insulation coating and the average thickness $d_p$ of the primary film, an averaging method through sectional observation may be used. In the averaging method through sectional observation, the sections of the tension insulation coating and the primary film are observed using a scanning electron microscope (SEM) and the film thicknesses of arbitrary ten points are measured. As the average thickness $d_t$ of the tension insulation coating and the average thickness $d_p$ of the primary film, the average value of the measured film thicknesses of the ten points is used. In addition, during the measurement, observation is performed using a COMPO image (reflection electron compositional image) and thus the tension insulation coating and the primary film can be easily distinguished from each other.

As the method of measuring the average thickness $d_t$ of the tension insulation coating and the average thickness $d_p$ of the primary film, in addition to the averaging method using the sectional observation, a Calotest (registered trademark) method or the like may be used.

In addition, voids contained in the coating are excluded from the film thickness measurement and calculation. For example, in a case where the thickness from the surface of the tension insulation coating to the interface with the primary film is 3 µm and 1 µm of voids are included in the thickness, the film thickness of the tension insulation coating at this measurement point is set to 2 µm.

In addition, the sectional observation is preferably performed in the following order. The grain-oriented electrical steel sheet is cut such that the cutting direction and the thickness direction are parallel to each other. The cut surface is carefully polished so as not to allow the tension insulation coating and the primary film to be peeled off and fallen off. The polished surface is etched using a preferable etchant as necessary, and the sectional observation is performed.

Next, a production method of the grain-oriented electrical steel sheet according to the embodiment will be described.

A silicon steel material containing 1.0 mass % to 4.0 mass % of Si is subjected to hot rolling and cold rolling, thereby producing a steel sheet having a predetermined sheet thickness. In addition, the silicon steel material may contain, as representative chemical components, in terms of mass fraction: Si: 1.0% to 4.0%, C: more than 0% to 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder of Fe and impurities.

After the cold rolling ends, decarburization annealing is performed on the steel sheet. The decarburization annealing is performed for the purpose of removing C from steel and improving magnetic properties. During the decarburization annealing, Si in the steel is oxidized and silica $SiO_2$ is formed on the surface of the steel sheet. Silica reacts with magnesia MgO, which will be described later, such that forsterite $Mg_2SiO_4$ for forming the primary film is formed.

During the decarburization annealing, the concentration of C is preferably limited to be 30 ppm or lower and more preferably 20 ppm or lower.

When the dew point (oxidation degree $PH_2O/PH_2$) during the decarburization annealing increases, an oxidation reaction of C and Si easily proceeds. Therefore, a larger amount of silica is formed as the dew point increases, and the amount of silica formed decreases when the dew point decreases.

That is, by adjusting the dew point during the decarburization annealing, the film thickness of the primary film can be adjusted. Specifically, the film thickness of the primary film can be decreased by decreasing the dew point during the decarburization annealing, and the film thickness of the primary film can be increased by increasing the dew point during the decarburization annealing.

The dew point during the decarburization annealing is not particularly limited, and for example, a range of the value of $PH_2O/PH_2$ may be 0.3 to 0.5.

After the decarburization annealing, the annealing separator is applied to the surface of the steel sheet, and the resultant is subjected to finish annealing at a temperature of 1100° C. or higher. The finish annealing is performed for the purpose of secondary recrystallization, and in this process, the primary film including forsterite is formed. In addition, during the finish annealing, inhibitor formation elements are discharged to the outside of the system. Therefore, in a grain-oriented electrical steel sheet that is finally obtained, the concentrations of N and S are significantly reduced and become 50 ppm or lower. In addition, the concentrations of N and S are preferably limited to be 20 ppm or lower, more preferably 10 ppm or lower, even more preferably 9 ppm or lower, and particularly preferably 6 ppm or lower.

As an application method of the annealing separator, well-known methods may be used. Particularly, a method of applying the annealing separator as a water slurry to the steel sheet using a roll coater or the like, a method of causing powder to adhere to the steel sheet through electrostatic coating, or the like is preferable.

The water slurry of the annealing separator contains a solid content primarily containing magnesia, and by adjusting the amount of the solid content in the water slurry and the amount of the magnesia in the solid content, the film thickness of the primary film can be adjusted. Specifically, the film thickness of the primary film can be reduced by reducing the amount of the solid content in the water slurry of the annealing separator and the amount of the magnesia in the solid content.

In the solid content of the annealing separator, additives other than the magnesia are also used. As the additives, those that participate in the reaction between silica and magnesia, those that cause silica on the surface of the steel sheet formed after the decarburization annealing to move into the annealing separator so as to promote the removal of silica, and the like may be employed. As the latter additives, alkali metal salts such as Li, Na, K, and Rb may be employed.

Since the alkali metal salts are added to the annealing separator, in the process of the finish annealing, the alkali metal salts act on the silica on the surface of the steel sheet formed during the decarburization annealing. Accordingly, the melting point of at least a portion of the silica decreases, and the silica shows fluidity. The silica with increased fluidity is likely to move into the annealing separator (into magnesia powder), and the silica moved into the annealing separator is removed when the annealing separator is removed after the finish annealing. That is, the silica moved into the annealing separator does not participate in the formation of the primary film containing magnesium silicate and consequently can limit the amount of Mg.

By adding $TiO_2$ to the annealing separator, the effect of the alkali metal salts described above becomes more significant.

The silica that shows fluidity due to the action of the alkali metal salts moves into the annealing separator, that is, into the magnesia powder. However, when the silica comes into contact with the surface of magnesia particles, the silica reacts therewith and loses its fluidity. On the other hand, $TiO_2$ is less likely to react with the silica than magnesia. Therefore, when $TiO_2$ is present, silica does not react with $TiO_2$ and can move on the surface such that a larger amount of silica can be absorbed by the annealing separator.

For the above-described reason, the film thickness of the primary film can be adjusted by adjusting the amount of $TiO_2$ in the annealing separator. Specifically, the film thickness of the primary film can be reduced by reducing the amount of $TiO_2$ in the annealing separator.

The amount of $TiO_2$ in the annealing separator is determined by the balance with the amount of the alkali metal salts and is not particularly limited. For example, the amount of $TiO_2$ in the annealing separator is 1 mass % to 10 mass %.

After the finish annealing, the tension insulation coating is formed on the surface of the steel sheet. Examples of the tension insulation coating include a coating formed by applying a water-based application solution containing a phosphate and colloidal silica. In this case, examples of the phosphate include phosphates such as Ca, Al, Mg, and Sr.

A method of forming the tension insulation coating is not particularly limited, and the tension insulation coating can be formed by applying the water-based application solution to the surface of the steel sheet using a grooved application roll or the like and baking the resultant in air.

Here, the film thickness of the tension insulation coating can be adjusted by adjusting the interval and depth of groove pitches of the grooved application roll. Specifically, by reducing the groove pitches of the grooved application roll and reducing the depth thereof, the film thickness of the tension insulation coating can be reduced.

Even by adjusting the baking temperature and baking time during the formation of the tension insulation coating, the film thickness of the tension insulation coating can be slightly adjusted. Specifically, by causing the baking temperature to be a high temperature and causing the baking time to be a long period of time during the formation of the tension insulation coating, the film thickness of the tension insulation coating can be reduced as a trend.

The baking temperature and baking time during the formation of the tension insulation coating are not particularly limited. For example, the baking temperature may be 700° C. to 900° C., and the baking time may be 10 seconds to 120 seconds.

After the tension insulation coating is formed, laser irradiation is performed on the grain-oriented electrical steel sheet.

During the laser irradiation, a laser may be emitted in a continuous line form in the transverse direction with intervals in the rolling direction. As the type of the laser, a $CO_2$ laser, a YAG laser, a fiber laser, or the like may be used.

In order to suppress an effect of the laser irradiation on the warpage of the steel sheet, the laser is preferably a continuous wave laser. It is thought that while a pulse laser applies stress to the steel sheet due to an impact reaction force of the laser, the continuous wave laser applies stress to the steel sheet primarily due to a thermal effect, the distributed state of the stress varies, and thus warpage is suppressed compared to the pulse laser.

When the laser irradiation is performed, the output during the laser irradiation may be constant, or the output during the laser irradiation may be different between a center portion and an end portion in an irradiation line longitudinal direction. By changing the output during the laser irradiation between the center portion and the end portion in the irradiation line longitudinal direction, core loss characteristics and magnetostriction characteristics in the transverse direction can be uniformized.

In a case where the output during the laser irradiation is constant, the laser output is not particularly limited, and for example, may be 0.8 $mJ/mm^2$ to 2.0 $mJ/mm^2$.

In a case where the output during the laser irradiation is changed between the center portion and the end portion in the irradiation line longitudinal direction, the output during the laser irradiation is not particularly limited. For example, the center portion in the irradiation line longitudinal direction may be irradiated with the laser at an output of 1.2 $mJ/mm^2$ to 2.0 $mJ/mm^2$ during the laser irradiation, and the end portion in the irradiation line longitudinal direction may be irradiated with the laser at an output of 0.8 $mJ/mm^2$ to 1.6 $mJ/mm^2$ during the laser irradiation.

Here, the end portion in the irradiation line longitudinal direction indicates a range of ⅓ in a case where the length of the irradiation line in the longitudinal direction is 1, and the center portion in the irradiation line longitudinal direction indicates a range outside of the range.

In the embodiment, during the laser irradiation, the direction of the laser light scanning a center position may be a direction perpendicular to the rolled surface, or may be shifted from the direction perpendicular to the rolled surface by a range of 1° to 10°. By shifting the scanning direction of the laser light from the direction perpendicular to the rolling direction by a range of 1° to 10°, lower magnetostriction characteristics can be obtained.

The production method of the grain-oriented electrical steel sheet may be appropriately selected depending on desired $\Delta S_C$ and $\Delta S_L$, the film thickness of the primary film, and the film thickness of the tension insulation coating.

Hereinafter, aspects of the present invention will be described in detail according to Examples. Examples are only examples for confirming the effects of the present invention and do not limit the present invention.

EXAMPLES

A cold-rolled sheet which was produced using a silicon steel material containing 3 mass % of Si to have a sheet thickness of 0.23 mm was subjected to decarburization annealing, an annealing separator primarily containing MgO was applied to the resultant and finish annealing was performed thereon, thereby obtaining a grain-oriented electrical steel sheet having a primary film. Next, a coating treatment liquid containing colloidal silica, aluminum phosphate, and magnesium phosphate was applied to the steel sheet, and the steel sheet was baked, thereby forming a tension insulation coating. At this time, the coating amount of the tension insulation coating on the front and rear surfaces of the steel sheet were varied by varying the coating weight of the coating treatment liquid. Thereafter, a magnetic domain refining treatment of further irradiating one surface of the steel sheet after the tension insulation coating was formed with a continuous wave laser having different irradiation energies. The laser is a $CO_2$ laser, and the irradiation was performed with an interval of 5 mm in a direction perpendicular to a rolling direction under the condition that the length of an irradiation line in the rolling direction was 0.1 mm, the output was 2 kW, and the scanning speed was 100 m/s to 600 m/s.

The core loss $W_{17/50}$ and the magnetostriction $\lambda_{0-p}$ of the obtained grain-oriented electrical steel sheets of Nos. 1 to 7 were measured.

The core loss $W_{17/50}$ was measured using a single sheet tester (SST).

The magnetostriction $\lambda_{0-p}$ was calculated from the length L of a material at the maximum excitation flux density and the length $L_0$ of the material at a flux density of 0.

In addition, three strip-like samples having a length of 300 mm in a direction parallel to the rolling direction and a length of 60 mm in a direction parallel to a transverse direction were extracted from each of the grain-oriented electrical steel sheets of Nos. 1 to 7. The extracted samples were pickled to produce samples A in which only one surface subjected to laser irradiation was pickled, samples B in which only one surface on the side opposite to the side subjected to laser irradiation, and samples C in which both surfaces were pickled, and the warpage amounts $S_A$, $S_B$, and $S_C$ thereof were measured in the same manner as the case in which FIG. 1 was obtained.

The average thickness $d_t$ of the tension insulation coating and the average thickness $d_p$ of the primary film were measured using an averaging method through sectional observation. Specifically, the sections of the tension insulation coating and the primary film were observed using a scanning electron microscope, the film thicknesses of arbitrary ten points were measured, and the average value of the measured film thicknesses of the ten points was used.

In addition, the space factor of the grain-oriented electrical steel sheet was measured in a method according to JIS C 2550:2011.

Regarding the grain-oriented electrical steel sheets of Nos. 1 to 7, the average thickness $d_p$ of the primary film, the average thickness $d_t$ of the tension insulation coating, $d_t/d_p$, the coating amount of the tension insulation coating, the laser irradiation energy, the warpage amounts $S_A$, $S_B$, and $S_C$ of the steel sheet, $\Delta S_C$ (=$S_A-S_C$), $\Delta S_L$ (=$S_B-S_C$), the core loss $W_{17/50}$, the magnetostriction $\lambda_{0-p}$, and the space factor were collectively shown in Table 1.

In addition, the coating amount of the tension insulation coating shown in Table 1 represents the coating amount per one surface of the steel sheet.

As a result, it was confirmed that when the values of $\Delta S_C$ and $\Delta S_L$ are in the range specified in the present invention, low core loss and low magnetostriction can be compatible with each other. On the other hand, in comparative examples, at least any one of core loss and magnetostriction was deteriorated.

[Table 1]

From the results of Table 1 and the other experimental results, it was found that in a case where the ratio $d_t/d_p$ between the average thickness $d_t$ of the tension insulation coating and the average thickness $d_p$ of the primary film is 0.1 to 3.0, the space factor is preferably improved, in a case where the ratio $d_t/d_p$ is 0.1 to 1.5, the vibration damping ratio as well as the space factor is preferably improved, and in a case where the ratio $d_t/d_p$ is 0.1 to 1.0, the heat dissipating property in addition to the vibration damping ratio and the space factor is preferably improved. For example, in the sample of No. 3 (the ratio $d_t/d_p$ is 0.63), the vibration damping ratio was increased by 20% and the heat dissipating rate in a lamination direction was increased by 15% compared to those of the sample of No. 7 (the ratio $d_t/d_p$ is 3.20).

INDUSTRIAL APPLICABILITY

According to the present invention, a grain-oriented electrical steel sheet which is excellent in both core loss and magnetostriction can be provided.

| No. | AVERAGE THICKNESS $d_p$ OF PRIMARY FILM (μm) | AVERAGE THICKNESS $d_t$ OF TENSION INSULATION COATING (μm) | $d_t/d_p$ | AMOUNT OF TENSION INSULATION COATING (g/m²) | LASER ENERGY (mJ/mm²) | $S_A$ (μm) | $S_B$ (μm) | $S_C$ (μm) |
|---|---|---|---|---|---|---|---|---|
| 1 | 2.8 | 0.8 | 0.29 | 1.0 | 1.3 | 16000 | 7000 | 200 |
| 2 | 1.6 | 1.6 | 1.00 | 2.7 | 1.1 | 29000 | 13600 | 300 |
| 3 | 1.9 | 1.2 | 0.63 | 2.0 | 1.8 | 21000 | 1200 | −200 |
| 4 | 3.6 | 2.1 | 0.58 | 3.6 | 1.5 | 30000 | 7300 | −100 |
| 5 | 1.2 | 2.5 | 2.08 | 4.2 | 1.4 | 34700 | 8500 | 400 |
| 6 | 3.5 | 0.3 | 0.09 | 0.5 | 0.9 | 13400 | 3700 | −200 |
| 7 | 1.0 | 3.2 | 3.20 | 5.0 | 1.6 | 37600 | 15800 | 500 |

-continued

| No. | $\Delta S_C$ (μm) | $\Delta S_L$ (μm) | CORE LOSS $W_{17/50}$ (W/kg) | MAGNETOSTRICTION $\lambda_{0-p}$ (×10$^{-6}$) | SPACE FACTOR (%) | REMARK |
|---|---|---|---|---|---|---|
| 1 | 15800 | 7200 | 0.74 | 0.23 | 98.3 | EXAMPLE OF PRESENT INVENTION |
| 2 | 28700 | 13900 | 0.73 | 0.20 | 97.8 | EXAMPLE OF PRESENT INVENTION |
| 3 | 21200 | 1000 | 0.72 | 0.24 | 98.2 | EXAMPLE OF PRESENT INVENTION |
| 4 | 30100 | 7200 | 0.74 | 0.21 | 97.6 | EXAMPLE OF PRESENT INVENTION |
| 5 | 34300 | 8900 | 0.73 | 0.23 | 97.9 | EXAMPLE OF PRESENT INVENTION |
| 6 | 13600 | 3500 | 0.77 | 0.28 | 96.8 | COMPARATIVE EXAMPLE |
| 7 | 37100 | 16300 | 0.72 | 0.31 | 96.0 | COMPARATIVE EXAMPLE |

The invention claimed is:

1. A grain-oriented electrical steel sheet comprising:
a base steel sheet;
a primary film formed on a surface of the base steel sheet; and
a tension insulation coating formed on a surface of the primary film,
wherein a magnetic domain control is performed by irradiating the tension insulation coating with a laser from above,
wherein a value $d_t/d_p$ obtained by dividing an average thickness $d_t$ of the tension insulation coating in the unit of μm by an average thickness $d_p$ of the primary film in the unit of μm is 0.1 or higher and 3.0 or lower, and
having a property wherein when a sample having a length of 300 mm in a direction parallel to a rolling direction of the grain-oriented electrical steel sheet and a length of 60 mm in a direction parallel to a transverse direction is extracted from the grain-oriented electrical steel sheet, a range from a surface of the tension insulation coating to a depth position of 5 μm toward the base steel sheet side from an interface between the base steel sheet and the primary film is removed by pickling at least one surface of the sample, and a warpage amount of the sample is thereafter measured, the warpage amount satisfies the following expressions A and B $$15000 \text{ μm} \leq S_A - S_C \leq 35000 \text{ μm} \quad \text{(Expression A)}$$

$$900 \text{ μm} \leq S_B + S_C \leq 14000 \text{ μm} \quad \text{(Expression B)}$$

wherein
$S_A$ is a warpage amount of the grain-oriented electrical steel sheet in the unit of μm when only one surface subjected to laser irradiation is pickled,
$S_B$ is a warpage amount of the grain-oriented electrical steel sheet in the unit of μm when only one surface on a side opposite to the side subjected to laser irradiation is pickled, and
$S_C$ is a warpage amount of the grain-oriented electrical steel sheet in the unit of μm when both surfaces are pickled,
wherein warpage in the same direction as that of the pickled surface during measurement of $S_A$ and $S_B$ is expressed as a positive value, and warpage in $S_C$ in the same direction as that of $S_A$ is expressed as a positive value.

2. The grain-oriented electrical steel sheet according to claim 1,
wherein a value $d_t/d_p$ obtained by dividing an average thickness $d_t$ of the tension insulation coating in the unit of μm by an average thickness $d_p$ of the primary film in the unit of μm is 0.1 or higher and 1.5 or lower.

3. The grain-oriented electrical steel sheet according to claim 1,
wherein a value $d_t/d_p$ obtained by dividing an average thickness $d_t$ of the tension insulation coating in the unit of μm by an average thickness $d_p$ of the primary film in the unit of μm is 0.1 or higher and 1.0 or lower.

4. The grain-oriented electrical steel sheet according to any one of claims 1, 2 and 3,
wherein the average thickness of the tension insulation coating is 0.5 μm or greater and 4.5 μm or smaller.

5. The grain-oriented electrical steel sheet according to any one of claims 1, 2 and 3,
wherein a total tension applied to the base steel sheet from the primary film and the tension insulation coating is 1 MPa or higher and 10 MPa or lower.

6. The grain-oriented electrical steel sheet according to claim 4,
wherein a total tension applied to the base steel sheet from the primary film and the tension insulation coating is 1 MPa or higher and 10 MPa or lower.

7. The grain-oriented electrical steel sheet according to claim 1,
wherein the laser is irradiated at an irradiation energy density of 0.8 mJ/mm$^2$ to 2.0 mJ/mm$^2$.

* * * * *